(12) United States Patent
Becnel

(10) Patent No.: US 11,745,869 B1
(45) Date of Patent: *Sep. 5, 2023

(54) TACTICAL RAPID ACCESS SMALL UNMANNED AERIAL SYSTEM

(71) Applicant: Eric Dupont Becnel, Madison, AL (US)

(72) Inventor: Eric Dupont Becnel, Madison, AL (US)

(*) Notice: Subject to any disclaimer, the term of this patent is extended or adjusted under 35 U.S.C. 154(b) by 185 days.

This patent is subject to a terminal disclaimer.

(21) Appl. No.: 17/330,905

(22) Filed: May 26, 2021

Related U.S. Application Data

(63) Continuation of application No. 16/138,978, filed on Sep. 22, 2018, now Pat. No. 11,027,839.

(60) Provisional application No. 62/561,671, filed on Sep. 21, 2017.

(51) Int. Cl.
| | | |
|---|---|---|
| *B64C 39/02* | (2023.01) |
| *F41C 27/00* | (2006.01) |
| *B64U 70/10* | (2023.01) |
| *B64U 80/00* | (2023.01) |
| *B64U 70/00* | (2023.01) |
| *B64U 101/00* | (2023.01) |
| *B64U 101/20* | (2023.01) |

(52) U.S. Cl.
CPC .............. *B64C 39/02* (2013.01); *B64U 70/00* (2023.01); *B64U 80/00* (2023.01); *B64U 2101/00* (2023.01); *B64U 2101/20* (2023.01); *B64U 2201/10* (2023.01); *F41C 27/00* (2013.01)

(58) Field of Classification Search
CPC ......... B64C 1/30; B64C 39/02; B64C 39/028; B64C 2201/08; B64C 2201/108; B64C 2201/122; B64C 2201/20; B64C 2201/201; B64F 1/04; B64U 70/00; B64U 80/00; B64U 2101/00; B64U 2101/20; B64U 2201/10; F41C 27/00
USPC .......................................... 244/17.23; 42/85
See application file for complete search history.

(56) References Cited

U.S. PATENT DOCUMENTS

| | | | |
|---|---|---|---|
| 7,467,762 B1* | 12/2008 | Parsons ................. | F42B 12/365 244/35 R |
| 9,038,938 B2 | 5/2015 | Muren et al. | |
| 9,527,596 B1* | 12/2016 | Adams .................. | B64C 39/024 |
| 10,035,597 B2* | 7/2018 | Desrochers ............ | B64D 17/38 |
| 10,054,939 B1* | 8/2018 | Applewhite .............. | B64F 1/06 |
| 10,118,697 B2 | 11/2018 | Weissenberg | |
| 10,370,122 B2 | 8/2019 | Fisher et al. | |
| 11,390,382 B1* | 7/2022 | Anderson .............. | B64D 17/80 |
| 2010/0123041 A1* | 5/2010 | Nair ......................... | F41F 1/00 124/71 |
| 2010/0281745 A1 | 11/2010 | Condon et al. | |
| 2012/0205488 A1* | 8/2012 | Powell .................. | B64C 39/024 244/63 |
| 2014/0239118 A1* | 8/2014 | Sapir ....................... | F41F 3/052 244/49 |

(Continued)

*Primary Examiner* — Joshua E Rodden
(74) *Attorney, Agent, or Firm* — Stephen H. Hall; Bradley Arant Boult Cummings LLP

(57) ABSTRACT

The invention specifies key small Unmanned Aerial System (sUAS) features which include the tactical mounting of the sUAS to a firearm for rapid access in tactical situations. The invention claims both the fixturing of a sUAS to a firearm and technologies and methodologies to allow for deployment of the sUAS utilizing a single hand of the operator.

20 Claims, 5 Drawing Sheets

(56) References Cited

U.S. PATENT DOCUMENTS

| | | |
|---|---|---|
| 2016/0122012 A1* | 5/2016 | Choo .................... B64C 27/50 |
| | | 244/17.23 |
| 2016/0347476 A1* | 12/2016 | Andryukov ............... B64F 1/04 |
| 2018/0170510 A1* | 6/2018 | Brock .................... B64C 27/12 |
| 2018/0244402 A1* | 8/2018 | Kahlon .................... B64F 1/04 |
| 2020/0079492 A1* | 3/2020 | Noskowicz ............... B64C 3/56 |
| 2020/0094954 A1* | 3/2020 | Becnel .................... F41G 3/02 |
| 2020/0140120 A1 | 5/2020 | Miralles et al. |
| 2022/0097867 A1* | 3/2022 | Kuperman ............ B64C 39/024 |

\* cited by examiner

TACTICAL RAPID ACCESS SMALL
UNMANNED AERIAL SYSTEM

CROSS-REFERENCE TO RELATED
APPLICATIONS

This application is a continuation of, and claims priority to, and the benefit of, U.S. application Ser. No. 16/138,978 titled "Tactical Rapid Access Small Unmanned Aerial System," filed Sep. 22, 2018, which claimed priority to U.S. Application Ser. No. 62/561,671 titled "Small UAV Technologies for Low Profile Containerized Storage," filed Sep. 21, 2017, the entire contents of which are herein incorporated by reference.

BACKGROUND OF THE INVENTION

The utility of small unmanned aerial systems (sUAS) has recently grown due to the capabilities of modern day electronic technologies. The new technologies often involve smaller, more effective, and more accessible sensors, communications systems, and power systems all enabling sUAS to disrupt traditional systems.

sUAS impact the individual person because fully operational systems can be included in their personal gear and can enhance their individual capabilities with an airborne platform. To utilize this capability for an individual, the system is carried, deployed and operated by that single individual. sUAS has major advantages for tactical applications due to the advanced sensor and communication system technologies which are becoming accessible.

In tactical situations, though, the access to the benefits of sUAS are limited due to a need to focus a significant amount of personal resources to the deployment of the sUAS. This potential distraction becomes a compromise which may outweigh the use of the sUAS. For this reason, improved sUAS design must minimize the operational workload to minimize the impact to the operator who is involved in the tactical situation.

Protective storage is required for sensitive and fragile equipment ensuring system readiness when deployed. sUAS typically have minimal structural margin for damage, requiring protective storage when stored. This technical cost is traded with the benefit of increased mission endurance.

SUMMARY OF THE INVENTION

The invention specifies key small Unmanned Arial System (sUAS) features which include the (A) tactical mounting of the sUAS to a firearm for rapid access in tactical situations, and (B) rapid deployment technology of a sUAS. The Purpose of the invention is to minimize the operational workload of deploying a sUAS.

The (A) tactical mounting of a small Unmanned Aerial System (sUAS) to a firearm for easy access is in such form that an operator does not have to significantly deviate from a "ready position" (or similar) to deploy the sUAS. A significant deviation includes moving the firearm to positions required to deploy the vehicle or utilization of more than 1 hand to perform the vehicle deployment. This feature includes the novelty of mounting the stored sUAS on the side of a firearm positioning the sUAS for immediate access for single handed deployment.

The (B) rapid deployment technology is a sUAS rapid deployment methodology and technologies enabling rapid air vehicle deployment from a stored configuration with one hand. This has three key features, including (a) a methodology for Air Vehicle removal from the storage component, (b) the technology of an air vehicle grip with integrated switch, and (c) the technology of a forward insertion electrical interconnect for monolithic storage and electrical connectivity. With this technology, an operator can grip and withdraw the air vehicle, command the air vehicle to start a mission and release the air vehicle with only 1 hand. In this process, the electrical connection to the storage system will be disconnected and any air vehicle deployable system (such as motor mounts and rotors) will automatically deploy enabling the system to be readied for an airborne mission to be started.

DESCRIPTION OF THE PRESENT INVENTION

The Tactical Rapid Access small Unmanned Aerial System (TRAsUAS) is a system which enables a tactical operator to have improved access to the utility of small Unmanned Aerial Systems (sUAS). This includes two unique characteristics: Fixtured storage for sUAS on the firearm and Rapid sUAS deployment technologies.

The characteristic of fixtured storage for sUAS on the firearm includes a configuration in which the stored sUAS mounted to the firearm only requires an operator to use of their "support hand" from a "ready position" to deploy the sUAS. The "ready position" is a handling position of the firearm where the operator is positioned to use the firearm if needed. The ready position considers one hand of the operator as the "firing hand". This hand is used to hold the trigger grip for primary operational control of the firearm and actuate the trigger if required. The second hand of the operator is considered the "support hand" and is used to support and manipulate the firearm. The support hand can be used for other tasks such as operate equipment, interact with surroundings, or reload the firearm. The mounting of the sUAS in such a way that the operator only requires use of there "support hand" to deploy the sUAS and allowing the "firing hand" to maintain continuous grip on the firearm ensures the operator always has the option of maintaining operational control the weapon. The mounting of the sUAS is provided by fixturing the storage component to the firearm where the air vehicle can be stored and stowed. The forces exerted to withdraw the air vehicle from the fixtured storage component may require a reaction force by the storage component to be transferred the firearm.

Figure 1:
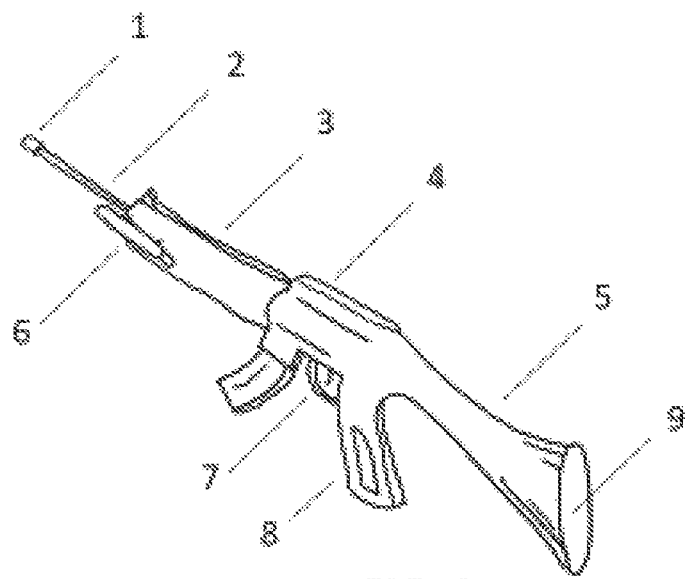
FIG. 1 illustrates an exemplified embodiment of a small Unmanned Aerial System in a stored configuration fixtured to the firearm's forestock by its storage container.
Figure 2:
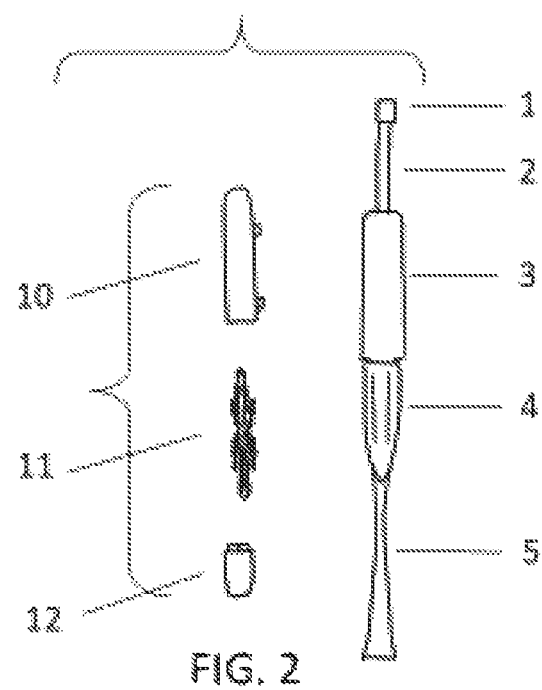
FIG. 2 illustrates an exploded view of an exemplified embodiment of a small Unmanned Aerial System in a stored configuration fixtured to the firearm's forestock by its storage container.
Figure 3:
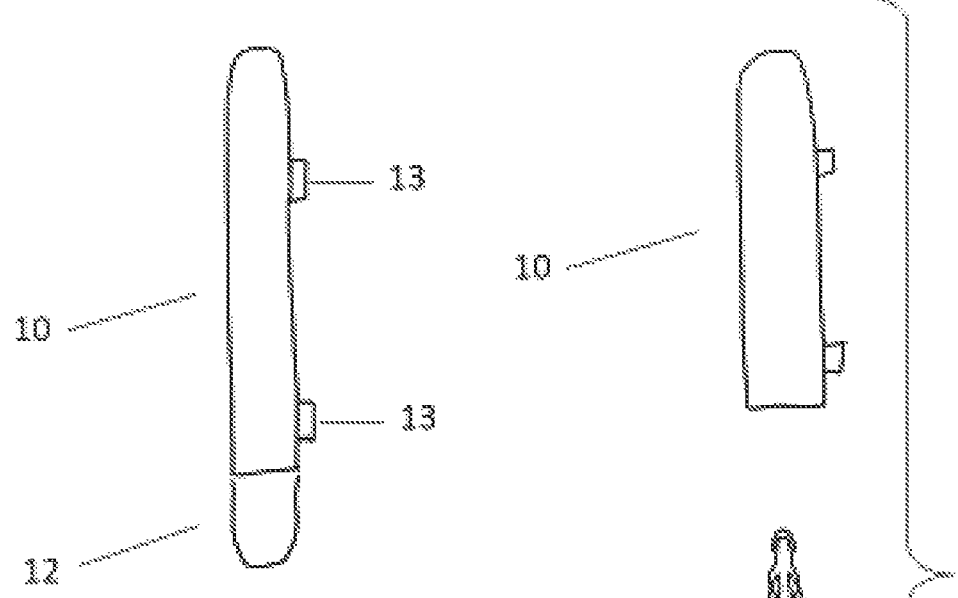
FIG. 3 illustrates an exemplified embodiment of a small Unmanned Aerial System in a stored configuration.
Figure 4:
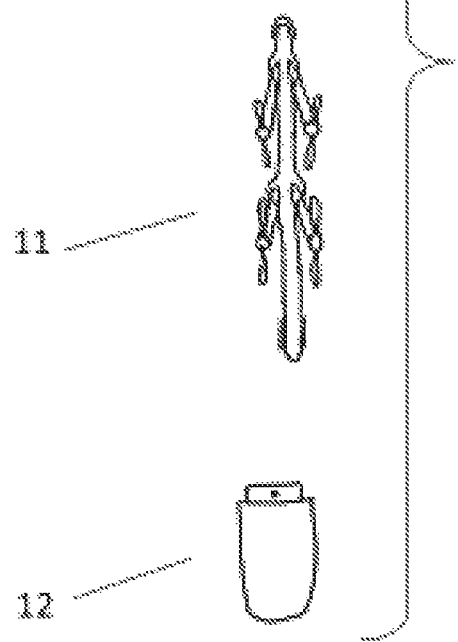
FIG. 4 illustrates an exploded view of an exemplified embodiment of a small Unmanned Aerial System in a stored configuration.

FIG. 1 and FIG. 2 are an embodiment of this feature is in the form of mounting the sUAS 6 by the storage component 10 to the exterior of the forestock 3 of the firearm. The forestock 3 is located between the muzzle 1 and receiver 4 of the firearm, often in line with barrel 2, and often used for handling with the "support hand". The orientation of the sUAS is such that the "support hand" alone can deploy the Air Vehicle from the stored configuration without requiring the firearm to be moved from the ready position. The operator controls the firearm utilizing the grip 8, stock 5 and butt 9 of the gun, while having the option to access the trigger 7 with the firing hand as required.

The characteristic of rapid sUAS deployment technologies focuses on the Air vehicle, storage component and operator interfaces and methodologies which uniquely enable rapid deployment of the Air Vehicle from the storage component. The air vehicle removal methodology is to have the operator grasp with their fingers an exposed grip to the air vehicle. The operator then withdraws the air vehicle from the storage container. The action of withdrawing the air vehicle will (a) activate an automatic actuation of any deployable systems required for flight and (b) disconnect the air vehicle to storage component electrical connection. Following this action to withdraw the air vehicle, the operator activates the flight phase of the air vehicle by a grip switch. This grip switch is pressure activated and does not require the operator to manipulate their grasp. The air vehicle is then positioned by the operator for launch and released for flight.

Due to the harsh exposer which may exist in a tactical environment, the storage component fully contains the air vehicle. In preparation for air vehicle removal, the storage component must be actuated to expose the air vehicle grip. The methodology of storage component actuation is to articulate a quick-release lid to expose the air vehicle. The air vehicle grip is positioned on the air vehicle to be revealed by the lid's actuation. Following the air vehicle deployment, the lid of the storage system is articulated by into its stored position. Quick-release implies a design optimized for time to perform the action.

The storage component and air vehicle share a mating electrical connection. The electrical connection may be of different forms, but uniquely is disconnected by the action of withdrawing the air vehicle from the storage component.

An embodiment of this characteristic is illustrated in FIGS. 3, 4, 5, 6, 7, 8, 9, and 10. The primary structure of the storage component 10 is in the form of a tube-like 21 storage component which can be opened to access the stored air vehicle 11. The tube has fixture points externally 13. The tube has a forward ridged closure 19 with an electrical connector 20 mounted on its interior aligned such that the connector's actuation is in-line with the axis of the tube. The storage component 11 has a removable lid 12 on the opposing end of the tube which is accessed. The lid has a recessed pocket 18 allowing for the air vehicle 11, while stored, to extend into the recessed pocket 18 allowing for a grip to be positioned to be exposed if the lid is removed 17. The removable lid employs a twist-lock 16 quick release formed with a guided slot 14 in the storage container 10 used to capture a pin 15 like feature on the removable lid 12.

Figure 5:
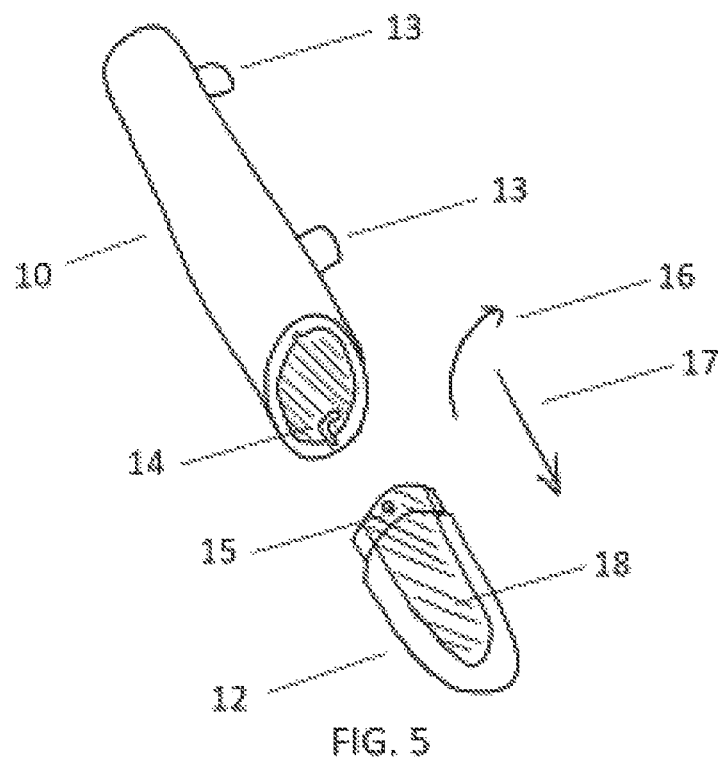
FIG. 5 illustrates an exemplified embodiment of a methodology to remove a lid from a storage container.
Figure 6:
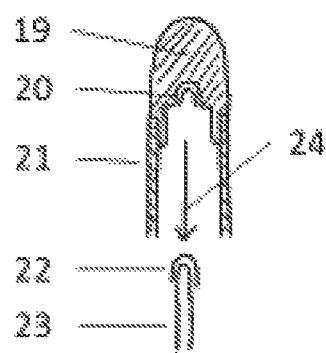
FIG. 6 illustrates an exemplified embodiment of a pair of electrical connectors positioned to interconnect when the air vehicle is stored in the storage container.
Figure 7:
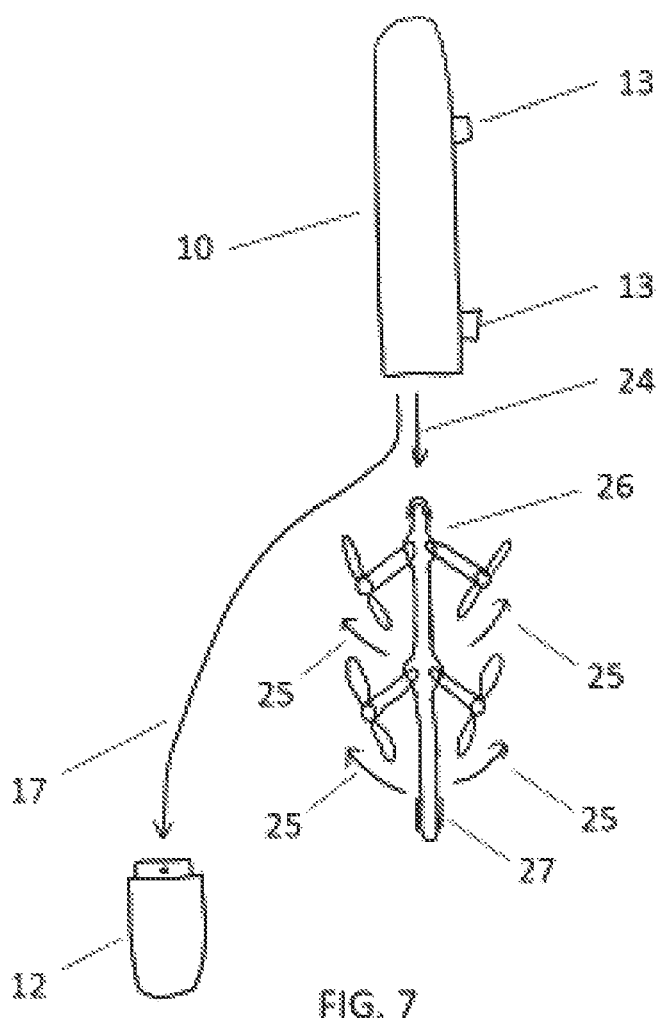
FIG. 7 illustrates an exemplified embodiment of a methodology to remove the air vehicle from a storage container.
Figure 8:
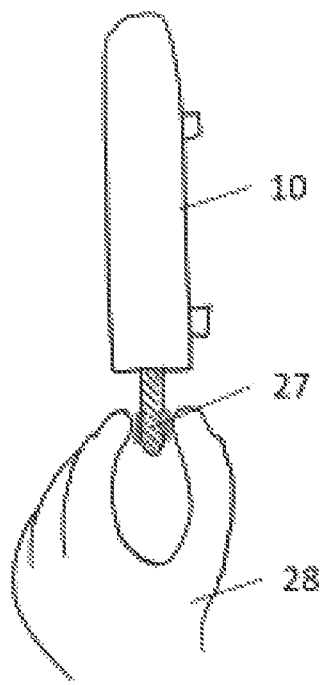
FIG. 8 illustrates an exemplified embodiment of an operator gripping the exposed grip of an air vehicle while the air vehicle is in an uncovered storage container.
Figure 9:
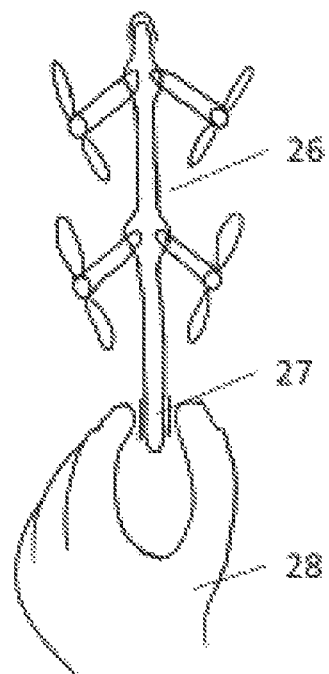
FIG. 9 illustrates an exemplified embodiment of an operator gripping the exposed grip of an air vehicle while the air vehicle is not in a storage container.
Figure 10:
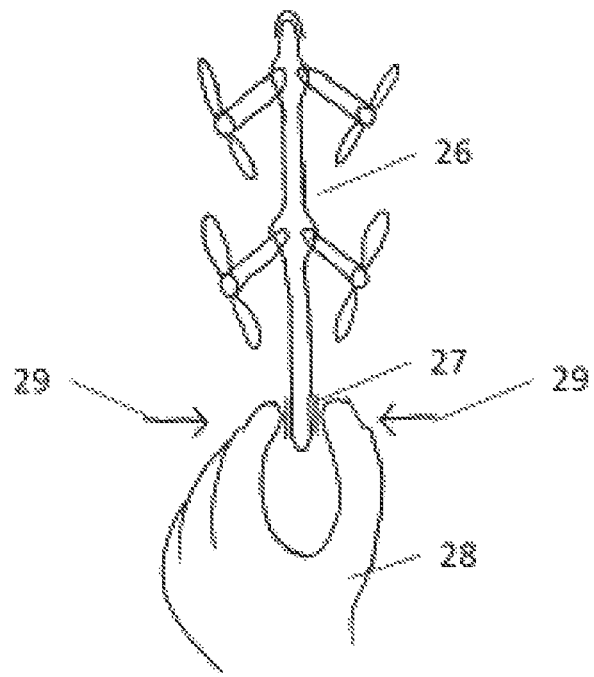
FIG. 10 illustrates an exemplified embodiment of a methodology to actuate a switch located in the grip of an air vehicle.

The deployment of the air vehicle from the storage component in this embodiment uses the methodology of removing the lid as illustrated in FIG. 5, gripping the air vehicle FIG. 8 with their hand 28, withdrawing the air vehicle 24 in a linear motion in axis with the tube FIG. 7, allowing any required deployable systems to actuate 25, handling the deployed air vehicle 26 through its grip 27 FIG. 9, commanding the air vehicle through its grip switch 29 FIG. 10, and releasing the air vehicle for flight. As the withdrawing of the air vehicle occurs, an electrical connection between the storage system electrical connector 20 and electrical connector 22 on the nose of the air frame 23 are disconnected passively FIG. 6.

What is claimed is:

1. A small unmanned aerial vehicle system comprising:
a storage housing having a removable cover wherein the storage housing has an open end configured to receive the removeable cover and a closed end, wherein an electrical connector is positioned at the closed end; and
an unmanned aerial vehicle having an elongated body having a handle end and an electrical connector end and a plurality of motor mounts and rotors,
and
wherein the elongated body electrical connector end comprises an electrical connector configured to mate with the storage housing electrical connector, and wherein the plurality of motor mounts and elongated body are configured to fit inside the storage housing and deployable upon removal from the storage housing;
and wherein the elongated body handle end extends out of the storage housing open end when the unmanned aerial vehicle is positioned in the storage housing and the storage housing electrical connector and elongated body electrical connector mate.

2. The small unmanned aerial vehicle system of claim 1 wherein the elongated body handle end comprises an actuator switch.

3. The small unmanned aerial vehicle system of claim 2 wherein the actuator switch is pressure activated.

4. The small unmanned aerial vehicle system of claim 1 wherein the storage housing is a tube, and wherein an axis of the storage housing integrated electrical connection is parallel with an axis of the storage housing.

5. The small unmanned aerial vehicle system of claim 1 wherein the elongated body handle comprises a pressure activated actuator switch, wherein the removeable cover is securable to the storage housing by a twist lock, and further comprising fixture points on an exterior surface of the storage housing configured to mount to a firearm stock.

6. The small unmanned aerial vehicle system of claim 1 wherein the unmanned aerial vehicle is configured to automatically activate upon removal from the storage housing and wherein at least one of the plurality of motor mounts is rotatable relative to the elongated body such that the at least one motor mount is configured to collapse against the elongated body in a storage position.

7. An unmanned aerial system comprising:
(a) a storage container comprising:
(i) a housing;
(ii) a housing lid;
wherein the housing has an open end configured to receive the housing lid and a closed end, wherein the closed end comprises a ridged closure having an integrated electrical connector; and (b) an unmanned aerial vehicle (UAV) comprising:
  (i) an elongated body having a handle end and an electrical connector end;
  (ii) a plurality of motor mounts and rotors;
wherein the elongated body electrical connector end comprises an electrical connector configured to mate with the storage container integrated electrical connector, and wherein the elongated body handle end comprises an actuator switch, and wherein the plurality of motor mounts and rotors are positioned along the elongated body and configured to fit inside the storage container housing and deployable upon removal from the storage container housing;
and wherein the elongated body handle end extends out of the storage container housing open end when the UAV is positioned in the storage container and the housing integrated electrical connector and UAV electrical connector mate.

8. The unmanned aerial system of claim 7 wherein the storage container housing lid is securable to the storage container housing by a twist lock.

9. The unmanned aerial system of claim 7 further comprising fixture points on an exterior surface of the storage container housing configured to mount to a firearm stock.

10. The unmanned aerial system of claim 7 wherein the container is a tube.

11. The unmanned aerial system of claim 7, wherein the actuator switch is pressure activated.

12. The unmanned aerial system of claim 10, wherein an axis of the storage container integrated electrical connection is parallel with an axis of the container tube.

13. The unmanned aerial system of claim 7 further comprising fixture points on an exterior surface of the storage container housing configured to mount to a firearm stock, wherein the storage container housing lid is securable to the storage container housing by a twist lock, wherein the actuator switch is pressure activated, wherein the container is a tube, and wherein an axis of the storage container integrated electrical connection is parallel with an axis of the container tube.

14. The unmanned aerial system of claim 7 wherein the unmanned aerial vehicle is configured to automatically activate upon removal from the storage housing and wherein at least one of the plurality of motor mounts is rotatable relative to the elongated body such that the at least one motor mount is configured to collapse against the elongated body in a storage position.

15. An unmanned aerial system comprising:
  a storage housing having a closed end, wherein an electrical connector is positioned at the closed end; and
  an unmanned aerial vehicle having an elongated body having a handle end and an electrical connector end and a plurality of rotors,
  and
  wherein the elongated body electrical connector end comprises an electrical connector configured to mate with the storage housing electrical connector, and wherein the elongated body is configured to be at least partially inserted into the storage housing when the storage housing electrical connector and the elongated body electrical connector mate;
  and wherein the elongated body handle end extends away from the storage housing when the unmanned aerial vehicle is inserted into the storage housing and the storage housing electrical connector and elongated body electrical connector mate.

16. The unmanned aerial system of claim 15 wherein the elongated body handle end comprises an actuator switch.

17. The unmanned aerial system of claim 16 wherein the actuator switch is pressure activated.

18. The unmanned aerial system of claim 15 wherein an axis of the storage housing integrated electrical connection is parallel with an axis of the storage housing, and wherein the storage housing has a removable cover wherein the storage housing has an open end configured to receive the removeable cover.

19. The unmanned aerial system of claim 15 wherein the elongated body handle comprises a pressure activated actuator switch, wherein the removeable cover is securable to the storage housing by a twist lock, and further comprising fixture points on an exterior surface of the storage housing configured to mount to a firearm stock.

20. The unmanned aerial system of claim 15 wherein the unmanned aerial vehicle is configured to automatically activate upon removal from the storage housing and wherein at least one of the plurality of rotors is configured such that the at least one rotor is configured to collapse along an axis parallel with an axis of the storage housing when the unmanned aerial vehicle is inserted into the storage housing.

* * * * *